United States Patent Office 3,101,321
Patented Aug. 20, 1963

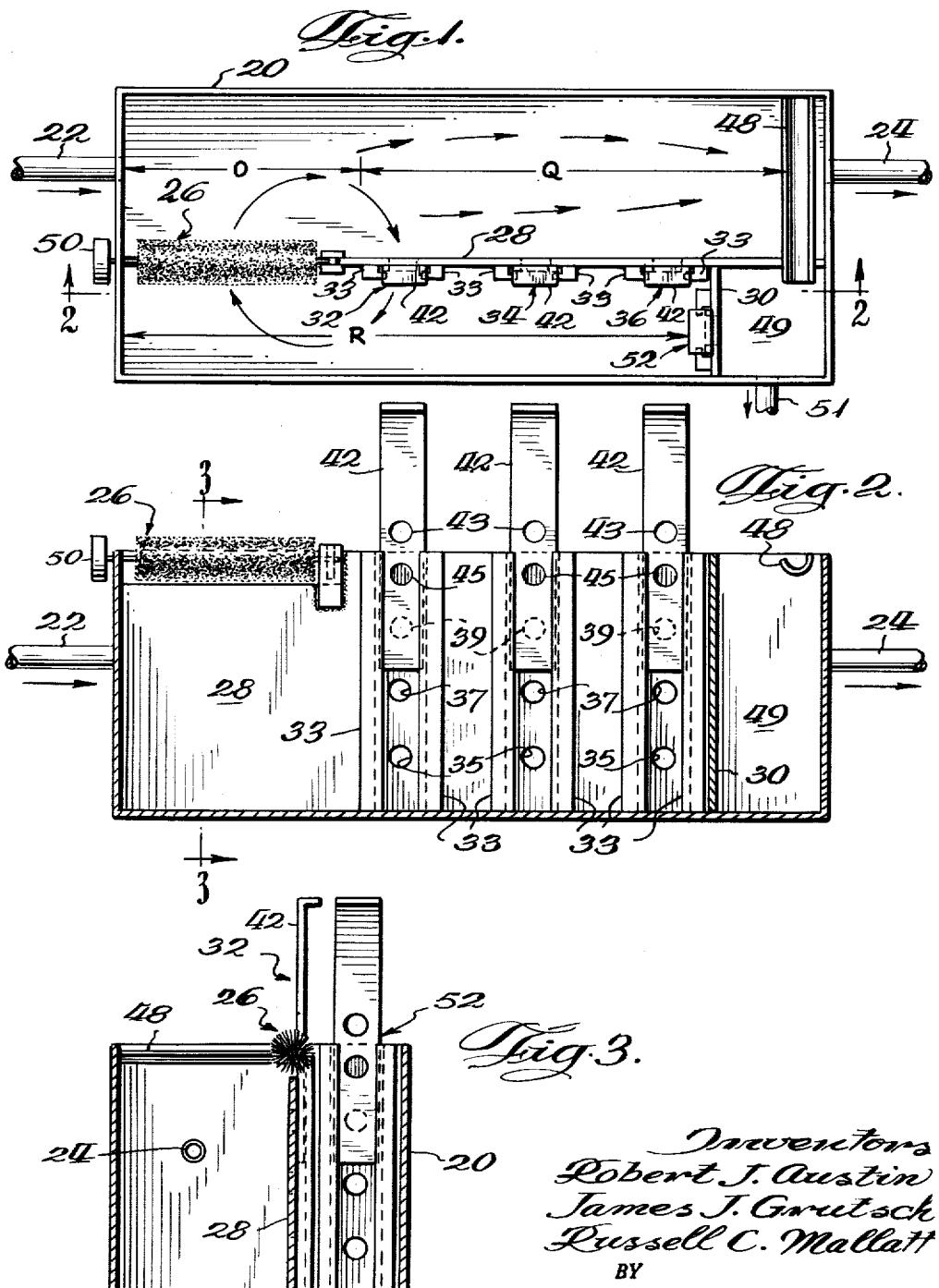

3,101,321
OXYGENATION APPARATUS
Robert J. Austin, Crete, Ill., and James F. Grutsch, Hammond, and Russell C. Mallatt, Crown Point, Ind., assignors to Standard Oil Company, Chicago, Ill., a corporation of Indiana
Filed Dec. 30, 1959, Ser. No. 862,948
5 Claims. (Cl. 210—151)

This invention relates to oxygenation apparatus and, more particularly, to an oxygenation unit which utilizes brush aeration apparatus for introducing air into a liquid.

In the oxidation treatment of waste water with air, it has been found the air-water reaction efficiency is enhanced if the air is in the form of finely divided and highly dispersed air particles. These air particles are preferably so small that upon being injected into the water, the air particles remain within the body of water for from about a few minutes to about several hours. Each air particle exhibits a relatively large air-water reaction surface as compared to the volume of the air particle. Processes which utilize this particular oxidation technique depend not only upon the air injection method but depend as well upon the subsequent handling of the air-water mixture.

The activated sludge process (for treatment of domestic sewage) is used to remove fine colloidal material and dissolved organic compounds which remain in the sewage after the large materials have been removed by screening and/or by gravitational settling. The biochemical reactions involved in the purification of liquids by such a process are bioprecipitation, absorption, and wet burning. The sewage, subsequent to the initial introduction of air, passes into a turbulent reaction zone. Floating colonies of saprophytic bacteria and protozoa soon develop as a result of the liquid aeration. These colonies may be two or three or more millimeters in diameter. The amount of growth developed in a new plant is relatively small. The aerated sewage is recirculated through the aeration apparatus. The return of sludge is continued until the sludge comprises from about 25 to about 30% by volume of the total inflow of raw sewage. In contact with this amount of sludge, the sewage is rapidly purified and the biological oxygen demand removed by absorption, wet burning, and bioprecipitation. Ammonia may or may not be oxidized to nitrates depending upon the amount of aeration employed. The excess sludge over that amount required for maintaining the process is removed and may be disposed of in any one of numerous ways such as, for example, drying, digestion, or a like process. After the oxygen or air has been introduced into the sewage, the chemical and/or biological action causes the impurities to form a floc. The fluids within the oxygenation unit are maintained turbulent to keep the heavy floc particles suspended within the liquid media. A portion of the liquid, containing floc particles, is recirculated to the inlet end of the oxygenation unit. A second portion of the liquid containing floc particles is removed from the oxygenation unit and passed to a settler. The heavy floc particles settle to the bottom of the settler and are removed therefrom.

The bioflotation process (for treatment of industrial waste water such as oil-containing refinery waste water) is used to remove oil of hydrocarbon origin which oil is dissolved or dispersed within the water. It is desirable that the oil content be reduced from about 100 to 200 p.p.m. to not more than about 30 p.p.m. and to as great an extent as possible. The phenolics content of this water may range from about 1 to 15 p.p.m. or more and is desirable that the phenolics be reduced to not substantially more than about .3 p.p.m. and preferably to a much lower figure. Threshhold odor number (T.O.N.) of the water may be in the order of 20,000 to 50,000 or more and it should be reduced to not more than about 6,000 or lower. After the initial injection of the air, particles which may be described as slime appear and grow. These slime particles accumulate in bulk in the downstream portion of the oxygenation apparatus. This biological slime functions in a manner analogous to sludge in accelerating both chemical and biological oxidation so that most of the oxygen content of the entrained air particles is effectively utilized. The slime particles provide nuclei or absorptive floc for coalescing oil and entrained organic matter and, at the same time, they tend to occlude the nitrogen and unused portion of the oxygen, the occluded gas tending to make the particles sufficiently buoyant so that the particles float to the surface of the liquid in the downstream quiescent portion of the oxygenation apparatus. Oil and other organic contaminants are coalesced on the slime and biologically induced floc particles and likewise buoyed upwardly by the unconsumed portion of the aerated gas. The oily, slimy material is removed from the surface of the water by a skimmer before it becomes sufficiently deaerated to settle back into the liquid.

It is, therefore, an object of this invention to provide an oxygenation apparatus which is capable of processing any one of a number of different waste water feed streams. It is a further object of this invention to provide an oxygenation apparatus wherein substantially all the liquid within the apparatus may be recirculated through the apparatus and through the aeration device. It is still a further object of this invention to provide an oxygenation apparatus wherein a portion of the liquid within the apparatus may be recirculated through the apparatus and through the aeration device while the remaining portion of the liquid within the apparatus may be maintained quiescent.

The apparatus disclosed herein is arranged to take advantage of the pump characteristics of the brush aeration unit. The arrangement of the brush in combination with a cellular structure eliminates the need for using a recycle pump.

Briefly described, the invention relates to an oxygenation unit which unit provides for circulating a water-air mixture through a predetermined variable flow path. An aeration brush is used to inject finely divided and highly dispersed air particles into a body of liquid. The flow pattern within the oxygenation unit may be changed from time to time to accommodate changing reaction conditions or changing waste water feed streams.

The invention will be more clearly understood from the following detailed description thereof read in conjunction with the accompanying drawings which form a part of this specification and in which:

FIGURE 1 is a plan view of an oxygenation unit for treating waste water;

FIGURE 2 is an elevational view, partially in cross section, of the apparatus in FIGURE 1, taken along section lines 2—2;

FIGURE 3 is an elevational view, partially in cross section, of the apparatus in FIGURE 2 taken along section lines 3—3;

FIGURE 4 is a plan view of an oxygenation unit adapted for use in an activated sludge process;

FIGURE 5 is a plan view of an alternate embodiment of an oxygenation unit adapted for use in a bioflotation process;

FIGURE 6 is an elevational view, partially in cross section, of the apparatus illustrated in FIGURE 5 taken along section lines 6—6.

Figure 7:
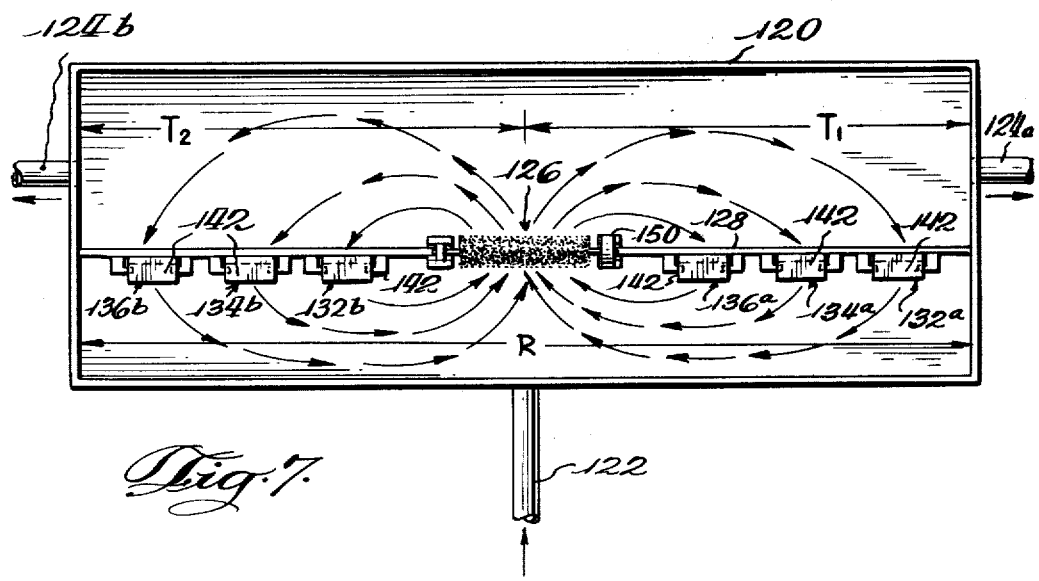
FIGURE 7 is a plan view of an alternate embodiment of an oxygenation unit adapted for use in an activated sludge process.

In further reference to the drawings and, more particularly to FIGURE 1, the aeration unit comprises an outer shell 20 which forms an elongated open-top aeration cell, an inlet pipe 22, an exit pipe 24, and a brush aeration unit 26. The aeration unit preferably has a cellular structure as defined by the outer shell 20, a longitudinal partition 28, and a traverse partition 30. The longitudinal partition 28 has an inner gate 32, an intermediate gate 34, and an outer gate 36. Each gate is fitted with guide channels 33 which slidably position plungers 42 with respect to the partition 28. Lower openings 35, middle openings 37, and upper openings 39 (FIGURE 2) are provided within the partition 28 between the guide channels 33. The plungers 42 have an upper plunger opening 43 and a lower plunger opening 45 therein. A skimmer 48 is provided near the exit end of the aeration unit. The skimmer 48 collects material from the surface of the liquid within the aeration unit and discharges the material into the sump 49. The sump 49 is formed by the intersection of the traverse partition 30, the longitudinal partition 28, and the outer shell 20. A skimmings withdrawal line 51 is used to remove material from the sump 49. The bioflotation aeration unit, as shown in FIGURE 1, is especially adapted to process industrial waste water or refinery waste water which contains as its major contaminant finely divided and highly dispersed oil with a minor amount of organic or bacteria promoting material therein.

In operation, a feed water stream, typically a petroleum refinery waste water discharged from a conventional A.P.I. separator, may be charged, for example, through inlet line 22 into the oxygenation unit (FIGURE 1). The brush of the brush aeration unit 26 is rotated by way of a drive means 50. As the brush is rotated, air is impelled into the water in the form of myriads of minute air particles. A thorough mixing of water and air is attained in the oxygenation zone O. The relatively stable air-water mixture passes from the oxygenation zone O into the quiescent zone Q. A slime dispersion accumulates in the quiescent zone of the oxygenation unit and oil as well as other organic contaminants coalesce on this slime and biologically induced floc particles form. These floc particles, containing oil and occluded air, are sufficiently buoyant to convey the oil-slime-air mixture to the surface of the liquid.

The inner gate 32, the intermediate gate 34, and the outer gate 36 provide for circulation of liquid from the quiescent zone Q to the recycle zone R. Any one of, any combination of, or all of these gates may be used to divert liquid from the quiescent zone to the recycle zone. The inner gate 32, the intermediate gate 34, and the outer gate 36 preferably include vertically spaced openings which provide a means to circulate liquids from the lower portion of the quiescent zone, from the middle portion of the quiescent zone, and from the top portion of the quiescent zone to the recycle zone. Lower openings 35, middle openings 37, and upper openings 39 are vertically spaced such that each of, a combination of, or all of the vertically spaced openings provide for communication of liquids through the longitudinal partition 28 as the plungers 42 are raised and lowered. A portion of the material recovered in the sump 49 may be recycled through the brush aeration unit by opening the sump gate 52 thereby providing biologically active "seed" for the process.

A "stratified" flow path may be maintained within the oxygenation unit. For example, a turbulent flow path may be maintained in the lower strata of the liquids within the oxygenation unit by positioning the plungers 42 such that only the lower openings 35 of the inner gate 32, of the intermediate gate 34, and of the outer gate 36 provide communication between the quiescent zone Q and the recycle zone R. Thus, the velocity of a portion of the liquids within the lowermost depths of the oxygenation unit is greater than the velocity of the remaining portion of liquids at the middle and at the uppermost depths. The "areal flow" path may be changed by opening any one of, any combination of, or all of the gates 32, 34, and 36. Thus, the flow path within the oxygenation unit may be changed in a vertical plane as well as in a horizontal plane.

The apparatus illustrated in FIGURE 5 provides for one oxygenation zone O and provides for a first quiescent zone $Q_1$ and for a second quiescent zone $Q_2$. In operation, a feed water stream may be charged, for example, through inlet line 22 into the oxygenation unit. The brush of the brush aeration unit 26 is rotated by way of a drive means 50. A first skimmer 48a and a second skimmer 48b are provided to collect material from the surface of the liquids within the first quiescent zone $Q_1$ and the second quiescent zone $Q_2$. The skimmers discharge this material into a first sump 49a and into a second sump 49b. A portion of the material collected in the first sump 49a and/or in the second sump 49b may be recycled through the brush aeration unit 26 by opening the first sump gate 52a and/or the second sump gate 52b. The first inner gate 32a, the second inner gate 32b, the first intermediate gate 34a, the second intermediate gate 34b, the first outer gate 36a, and the second outer gate 36b provide for circulation of liquid from the first quiescent zone $Q_1$ and from the second quiescent zone $Q_2$ to the recycle zone R. Any one of, any combination of, or all of these gates may be used to divert liquid from the quiescent zones to the recycle zone. The inner gates 32a and 32b, the intermediate gates 34a and 34b, and the outer gates 36a and 36b preferably include vertically spaced openings which provide a means to circulate liquid from the lower portion of the quiescent zone, from the middle portion of the quiescent zone, and from the top portion of the quiescent zone to the recycle zone R. Lower openings 35, middle openings 37, and upper openings 39 (FIGURE 6) are vertically spaced such that each of, a combination of, or all of the vertically spaced openings provide for communication of liquids through the longitudinal partition 28 as the plungers 42 are raised and lowered.

The aeration unit, as illustrated in FIGURE 4, comprises an outer shell 120, an inlet pipe 122, an exit pipe 124, and a brush aeration unit 126. The aeration unit preferably has a cellular shape as defined by the outer shell 120 and a longitudinal partition 128. The longitudinal partition 128 has an inner gate 132, an intermediate gate 134, and an outer gate 136 therein. Each gate is fitted with guide channels 133 which slidably position plungers 142 with respect to the partition 128. Lower openings, middle openings, and upper openings are provided within the partition 128 between the guide channels 133. The plungers 142 have an upper plunger opening and a lower plunger opening therein. The activated sludge aeration unit, as shown in FIGURE 4, is especially adapted to process domestic waste water.

In operation, a domestic waste or ordinary sewage water stream may be charged, for example, through the inlet line 122 into the oxygenation unit. The brush of the brush aeration unit is rotated by way of a drive means 150. As the brush is rotated, air is impelled into the water in the form of myriads of minute air particles. The air and water are thoroughly mixed throughout the entire turbulent zone T.

The inner gate 132, the intermediate gate 134, and the outer gate 136 provide for circulation of liquids from the turbulent zone T to the recycle zone R. Any one of, any combination of, or all of these gates may be used to divert liquid from the turbulent zone to the recycle zone R. The inner gate 132, the intermediate gate 134, and the outer gate 136 preferably include vertically spaced openings which provide a means to circulate liquids from the lower portion of the turbulent zone, from the middle portion of the turbulent zone, and from the top portion of the turbulent zone to the recycle zone R. The lower openings, middle openings, and upper openings are vertically spaced such that each of, a combination of, or all of the vertically spaced openings provide for communication of liquids through the longitudinal partition 128 as the plungers 142 are raised and lowered.

The apparatus illustrated in FIGURE 7 provides for a first turbulent zone $T_1$ and a second turbulent zone $T_2$. In operation, a feed water stream may be charged, for example, through inlet line 122 into the oxygenation unit. The brush of the brush aeration unit 126 is rotated by way of a drive means 150. The first inner gate 132a, the second inner gate 132b, the first intermediate gate 134a, the second intermediate gate 134b, the first outer gate 136a, and the second outer gate 136b provide for circulation of liquid from the first turbulent zone $T_1$ and from the second turbulent zone $T_2$ to the recycle zone R. Lower openings, middle openings and upper openings in the longitudinal partition 128 are vertically spaced such that each of, a combination of, or all of the vertically spaced openings provide for communication of liquids through the longitudinal partition 128 as the plungers 142 of their respective gates are raised and lowered. Fluids are removed from the oxygenation unit by way of the first exit line 124a and the second exit line 124b.

A "stratified" flow path may be maintained within the oxygenation unit. For example, a turbulent flow path may be maintained in the lower strata of the liquids within the oxygenation unit by positioning the plungers 142 such that only lower openings of the inner gate 132 of the intermediate gate 134, and of the outer gate 136 provide communication between the turbulent zone T and the recycle zone R. Thus, the velocity of the lowermost portion of the liquids within the aeration unit is greater than velocity of the remaining uppermost portion of the liquids within the oxygenation unit. This feature is desirable in the activated sludge process in that it allows for reaction in the upper, less turbulent portion of the liquids with the subsequent formation of sludge particles which particles tend to fall to the bottom of the oxygenation unit. As these particles enter the higher velocity, lower portion of the oxygenation unit, they are carried in the high velocity liquid stream back through the brush aeration unit and subsequently back into the turbulent zone as a seed material. The areal path may be changed by opening any one of, any combination of, or all of the gates 132, 134, and 136. Thus, the flow path within the oxygenation unit may be changed in a vertical plane as well as in a horizontal plane.

In the continuous process of treating waste water, as in most continuous processes, the start-up thereof results in an initial determination of optimum operating conditions such as, for example, the optimum throughput flow rate, the optimum recycle flow rate from the quiescent zone to the recycle zone, the optimum brush rotation speed, the optimum recirculation flow pattern and so forth. Certain variables such as, for example, a change in the composition of the inlet stream, a change in the temperature of the water, a change in the atmospheric temperature, a change in thee control specifications of the exit stream, and the like, may affect these "optimum operating conditions." The dual-flow units illustrated in FIGURE 5 and FIGURE 7 are especially adapted to determine new optimum operating conditions. A portion of this unit may be used as a research instrument to determine more desirable operating flow conditions while the remaining portion of the unit is maintained at the previously existing operating flow conditions. Thus, in effect, a part of the unit may be used as a research unit while the remaining part is used as a reference unit to determine the improvement or the lack of improvement attained by changing the flow conditions within the unit. The dual-flow units may be operated on a split-flow pattern wherein 50% of the inlet stream is withdrawn from the first exit pipe and 50% of the inlet stream is withdrawn from the second exit pipe. The liquid withdrawn from the oxygenation unit may be withdrawn solely from the first exit pipe, solely from the second exit pipe, or may be withdrawn in any flow combination utilizing the two exit pipes. Thus, the respective flow rates and flow patterns within the oxygenation unit may be changed to compare the relative effectiveness of the particular flow conditions thus selected.

The variable areal flow pattern feature of this invention, for the first time, provides an oxygenation unit which is capable of handling waste water feed streams having the characteristics of a domestic sewage water stream, having the characteristics of an industrial waste water stream, or a combination thereof.

The variable stratified flow pattern feature of this invention, for the first time, provides an oxyengation unit whereby differential laminar flow velocities are provided between the superposed quiescent liquids and the recycle liquids. The recycle liquids as a result of this provision are characterized as having a higher concentration of the heavier components (biologically active particles) which are the preferred seed components for a recycle stream.

The means of diverting liquids from the first side of the longitudinal partition 36 to the other side of the longitudinal partition 36 may comprise any of various known flow control units. By way of illustration and not by way of limitation, a gate arrangement has been illustrated. The partition has located therein three vertically spaced holes. The gate contains two vertically spaced holes. With the particular hole spacing, as illustrated in the drawings, fluids can be diverted from one side of the partition to the other side of the partition through the bottom hole, the middle hole, the top hole, the top hole and the bottom hole, the middle hole and the bottom hole or all three holes simultaneously by simply changing the position of the gate with respect to the partition. The above separate settings are illustrated in FIGURE 6.

Manifestly, the construction as shown and described is capable of some additional modification and such modification as may be construed to fall within the scope and meaning of the appended claims is also considered to be within the spirit and intent of the invention.

We claim:
1. An apparatus for oxygenating liquid which comprises an elongated liquid-retaining cell; an inlet for introducing liquid to be treated into said cell; an outlet for withdrawing treated liquid from said cell; means for maintaining a liquid level within said cell; a first compartment and a second compartment in said cell; a vertical partition extending the length of said cell and separating said compartments, said vertical partition having an upper edge which is above said liquid level for a substantial portion of its length and which is below said liquid level for another portion of its length; rotatable aeration brush means positioned horizontally above that portion of the upper edge of said vertical partition which is below said liquid level, the radius of said brush means extending partially below the liquid level of said cell; the rotational axis of said brush means being substantially in alignment with said vertical partition whereby the rotation of said brush means impels air into liquid adjacent said vertical partition and causes liquid in said cell to move in the direction of rotation from one of said compartments to the other of said compartments over said partition; a plurality of gates mounted in said vertical partition, each of said gates including a plurality of vertically spaced openings communicating said first compartment with said second compartment and a slide member having a plurality of vertically spaced openings, said slide member being capable of being raised and lowered with respect to said openings in said partition to provide varying horizontal flow paths between said first compartment and said second compartment; means for rotating said brush means to introduce air into liquid in said cell and to circulate liquid between said compartments; skimmer means positioned near the outlet of said cell to collect floating material from the surface of liquid within said cell and to discharge therefrom collected material; sump means positioned near said cell outlet to receive material discharged from said skimmer means; means for withdrawing said material from said sump; and means for diverting at least a portion of said material in said sump to liquid in said cell.

2. Apparatus for oxygenating liquid which comprises on elongated liquid-retaining cell; an inlet for introducing liquid to be treated into said cell; an outlet for withdrawing treated liquid from said cell; means for maintaining a level of liquid within said cell; a first compartment and a second compartment in said cell; a vertical partition extending the length of said cell and separating said compartments, said vertical partition having an upper edge which is above said liquid level for a substantial portion of its length and which is below said liquid level for another portion of its length; rotatable aeration brush means positioned horizontally above that portion of the upper edge of said vertical partition which is below said liquid level, the radius of said brush means extending partially below the liquid level of said cell to contact liquid therein, the rotational axis of said brush means being substantially in alignment with said vertical partition whereby rotation of said brush means causes liquid in said cell to pass from one of said compartments to the other of said compartments over said partition; a plurality of gates mounted in said vertical partition, each of said gates including a plurality of vertically spaced openings communicating said first compartment with said second compartment and a slide member having a plurality of vertically spaced holes therein, said slide member being capable of being raised and lowered with respect to said vertically spaced openings to provide varying horizontal flow paths between said first compartment and said second compartment; means for rotating said brush means to introduce air into liquid in said cell, to move liquid in the direction of rotation over said vertical partition, and to cause liquid to circulate through said gate means.

3. Apparatus for oxygenating liquid which comprises an outer shell defining an elongated shell having an inlet end and an outlet end; a vertical partition extending longitudinally from one end of said cell to the other end of said cell to form a first compartment and a second compartment within said cell, said vertical partition having an upper edge which is above said liquid level for a substantial portion of its length and which is below said liquid level for another portion of its length; means for introducing liquid to be treated into said first compartment at said inlet end; means for withdrawing treated liquid from said first compartment at said outlet end; means for maintaining a level of liquid in said cell; rotatable aeration brush means positioned horizontally above that portion of the upper edge of said vertical partition which is below said liquid level, the radius of said brush means extending partially below the liquid level of said cell to contact liquid therein, the rotational axis of said brush means being substantially in alignment with said vertical partition, said brush means being located adjacent the inlet end of said cell; means for rotating said brush means to introduce air into liquid introduced into said cell and to circulate said liquid in said cell; a plurality of gates mounted in said vertical partition, each of said gates including a plurality of vertically spaced openings communicating said first compartment with said second compartment and a slide member having a plurality of vertically spaced holes therein, said slide member being capable of being raised and lowered with respect to said vertically spaced openings to provide varying horizontal flow paths between said first compartment and said second compartment; a transverse partition near the outlet end of said second compartment, said partition extending from said shell to said longitudinal partition to form a sump in said cell; skimmer means positioned in said first compartment near the outlet end of said cell to collect floating material from the surface of liquid within said cell and positioned to discharge said collected material into said sump; means for withdrawing said material from said sump; and means for diverting at least a portion of said material from said sump to the circulating liquid in said cell.

4. The apparatus of claim 2 wherein there is provided skimmer means positioned in said first compartment near the outlet of said cell to collect floating material from the surface of liquid within said cell and to discharge said collected material; a sump positioned to receive material discharged from said skimmer means; and means for withdrawing said material from said sump.

5. The apparatus of claim 4 wherein there is provided means for diverting at least a portion of said material in said sump to the circulating liquid in said cell.

References Cited in the file of this patent

UNITED STATES PATENTS

| | | |
|---|---|---|
| 234,670 | Hall | Nov. 23, 1880 |
| 1,343,797 | Stott et al. | June 15, 1920 |
| 2,098,152 | Kessener | Nov. 2, 1937 |
| 2,684,941 | Pasveer | July 27, 1954 |
| 2,797,706 | Harrison | July 2, 1957 |
| 2,798,042 | Cox | July 2, 1957 |
| 2,813,074 | Banks et al. | Nov. 12, 1957 |

UNITED STATES PATENT OFFICE
CERTIFICATE OF CORRECTION

Patent No. 3,101,321            August 20, 1963

Robert J. Austin et al.

It is hereby certified that error appears in the above numbered patent requiring correction and that the said Letters Patent should read as corrected below.

Column 5, line 43, before "path" insert -- flow --; line 58, for "thee" read -- the --; column 7, line 7, for "on" read -- an --.

Signed and sealed this 31st day of March 1964.

(SEAL)
Attest:
ERNEST W. SWIDER

Attesting Officer

EDWARD J. BRENNER

Commissioner of Patents